United States Patent
Schuelke et al.

(10) Patent No.: US 10,443,875 B2
(45) Date of Patent: Oct. 15, 2019

(54) METHOD FOR OPERATING A THERMAL SYSTEM AND A THERMAL SYSTEM

(71) Applicant: NEC EUROPE LTD., Heidelberg (DE)

(72) Inventors: Anett Schuelke, Gaiberg (DE); Mischa Schmidt, Heidelberg (DE)

(73) Assignee: NEC CORPORATION, Tokyo (JP)

(*) Notice: Subject to any disclaimer, the term of this patent is extended or adjusted under 35 U.S.C. 154(b) by 117 days.

(21) Appl. No.: 15/548,773

(22) PCT Filed: Feb. 11, 2015

(86) PCT No.: PCT/EP2015/052841
§ 371 (c)(1),
(2) Date: Aug. 4, 2017

(87) PCT Pub. No.: WO2016/128036
PCT Pub. Date: Aug. 18, 2016

(65) Prior Publication Data
US 2018/0023830 A1 Jan. 25, 2018

(51) Int. Cl.
*F24F 11/30* (2018.01)
*G05B 15/02* (2006.01)
(Continued)

(52) U.S. Cl.
CPC ............. *F24F 11/30* (2018.01); *F24F 11/62* (2018.01); *G05B 13/0265* (2013.01);
(Continued)

(58) Field of Classification Search
CPC .. F24F 11/30; F24F 11/62; F24F 11/65; F24F 2130/00; F24F 2130/10; F24F 11/46;
(Continued)

(56) References Cited

U.S. PATENT DOCUMENTS

| 8,126,574 B2 | 2/2012 | Discenzo et al. |
| 2004/0133314 A1* | 7/2004 | Ehlers ............... G06Q 10/10 700/276 |

(Continued)

FOREIGN PATENT DOCUMENTS

| DE | 202010011984 U1 | 12/2010 |
| DE | 102013201750 A1 | 8/2014 |

(Continued)

OTHER PUBLICATIONS

Ali Hajiah, Moncef Krarti, Optimal control of building storage systems using both ice storage and thermal mass—Part I: Simulation environment, Energy Conversion and Management, vol. 64, pp. 499-508 (Year: 2012).*

*Primary Examiner* — Christopher E. Everett
(74) *Attorney, Agent, or Firm* — Leydig, Voit & Mayer, Ltd.

(57) ABSTRACT

A method for operating a thermal system, wherein a component of a facility or building has to be heated and/or cooled by the thermal system, includes selecting a control mode of the thermal system for bringing and/or maintaining the component to or at a definable temperature value or to or within a definable temperature value range. The control mode is dynamically selected from multiple different control modes under consideration of at least one boundary condition of the component and/or at least one environmental context parameter and under consideration of data regarding learnt/adapted thermal behavior of the component.

15 Claims, 3 Drawing Sheets (51) Int. Cl.
*F24F 11/62* (2018.01)
*G05B 13/02* (2006.01)
*F24F 140/60* (2018.01)
*F24F 120/20* (2018.01)
*F24F 130/20* (2018.01)
*F24F 11/64* (2018.01)
*F24F 130/00* (2018.01)
*F24F 130/10* (2018.01)
*F24F 11/46* (2018.01)
*F24F 11/65* (2018.01)
*F24F 11/56* (2018.01)
*F24F 110/10* (2018.01)
*F24F 110/12* (2018.01)

(52) U.S. Cl.
CPC .............. *G05B 15/02* (2013.01); *F24F 11/46* (2018.01); *F24F 11/56* (2018.01); *F24F 11/64* (2018.01); *F24F 11/65* (2018.01); *F24F 2110/10* (2018.01); *F24F 2110/12* (2018.01); *F24F 2120/20* (2018.01); *F24F 2130/00* (2018.01); *F24F 2130/10* (2018.01); *F24F 2130/20* (2018.01); *F24F 2140/60* (2018.01); *G05B 2219/2614* (2013.01)

(58) Field of Classification Search
CPC .... F24F 2120/20; F24F 2130/20; F24F 11/56; F24F 2110/10; F24F 2110/12; F24F 11/64; F24F 2140/60; G05B 13/0265; G05B 15/02; G05B 2219/2614
See application file for complete search history.

(56) References Cited

U.S. PATENT DOCUMENTS

| | | | |
|---|---|---|---|
| 2007/0213880 A1* | 9/2007 | Ehlers | H02J 3/14 700/295 |
| 2010/0057259 A1 | 3/2010 | Dawson et al. | |
| 2011/0153090 A1 | 6/2011 | Besore et al. | |
| 2012/0101648 A1 | 4/2012 | Federspiel et al. | |
| 2012/0150359 A1* | 6/2012 | Westergaard | H02J 3/14 700/291 |
| 2013/0024799 A1* | 1/2013 | Fadell | G05D 23/1902 715/771 |
| 2013/0103622 A1* | 4/2013 | Matsuoka | H04L 12/2825 706/12 |
| 2013/0338837 A1* | 12/2013 | Hublou | G05D 23/1923 700/278 |
| 2015/0370272 A1* | 12/2015 | Reddy | G05B 15/02 700/278 |

FOREIGN PATENT DOCUMENTS

| | | |
|---|---|---|
| WO | WO 2013039553 A1 | 3/2013 |
| WO | WO 2014089694 A1 | 6/2014 |

\* cited by examiner

METHOD FOR OPERATING A THERMAL SYSTEM AND A THERMAL SYSTEM

CROSS REFERENCE TO RELATED APPLICATIONS

This application is a U.S. National Stage Application under 35 U.S.C. § 371 of International Application No. PCT/EP2015/052841 filed on Feb. 11, 2015. The International Application was published in English on Aug. 18, 2016 as WO 2016/128036 A1 under PCT Article 21(2).

FIELD

The present invention relates to a method for operating a thermal system, wherein a component of a facility or building is to be heated and/or cooled by the thermal system. Further, the present invention relates to a corresponding thermal system, wherein a component of a facility or building is to be heated and/or cooled by the thermal system.

BACKGROUND

Methods for operating a thermal system and corresponding thermal systems as mentioned before are known from prior art. Such thermal systems can be heating and cooling systems.

Heating and cooling systems such as heating, ventilation or air conditioning—normally referred to as HVAC in buildings—are typically controlled by set points. If a control variable exceeds or undercuts the set point, the cooling or heating operation control is applied, often for prolonged periods of time. It is common practice in the state of the art to adjust set points to impact output variables. Additionally, when not adjusting set points, heating and cooling systems can also be de-activated or throttled to reduce energy use when set points are violated. For this, different operational runtime periods might be applied.

Thermal inertia in buildings—important for the overall energetic behaviour of the buildings and playing a crucial role in considerations about thermal storage potential—is less considered as dynamic buildings simulations consume high computation time and require the knowledge of many geometrical and physical parameters, which are often difficult to retrieve from the existing systems. To meet savings or balancing criteria, the use of thermal inertia and its control operation for using its storage potential is essential, see R. Tribalat "Modelling thermal inertia for load prediction purposes", Centre for environmental policies, Imperial College UK, 2009.

Special purpose facilities like sport centers, factories, etc. drive large-scale components which drive up a substantial amount of energy, which reaches beyond the core HVAC operation of buildings and has a strong link to the facility energy management. In a particular study of grass pitch operation for soccer arena, the management of the thermal properties of the grass field is crucial for business operation itself and at least contributing 50% to the overall energy consumption.

It is common in building systems that there are multiple—independent—control operations possible to reach the same goal via different process paths, e.g. heating rooms via air-conditioning unit versus static heating system, and increase supply temperatures versus applying a lower static temperature for prolonged periods.

In real practice, these different operations are used interchangeable but in static mode based on availability of resources/time. The impact of the control mode, however, depends strongly on the environmental context like climate or ambient temperature, and might not reach business target as requested, e.g. reaching a certain temperature/comfort at a defined time interval. The existing deployments of these control options might consider context for optimizing a specific operation mode and lead the respective input operation parameters. However, there is no measure in place to choose the context-appropriate, most efficient operational control options.

Within the special case of grass pitch heating, the driving point for correct operation is the thermal inertia of the grass pitch. This however is strongly dependent on environmental context which needs an integrated evaluation to choose the right control option to serve the operational goals efficiently. It also very much depends on the operational settings how the impact correlates with the context and the final result.

The main problem considering thermal inertia in control systems is driven by the complexity of the existing models. In case of grass pitch material, the porous media exhibits the thermal characteristics of solid state with very large surface and to some extend fluid intermixing due to different state of irrigation of the ground. Physical models provide high complexity which cannot be applied easily in the daily operation field due to missing detailed physical measurements, see H. A. Dinulescu "An application of irreversible thermodynamics to the problem of heat and moisture migration in soil", Wärme—und Stoffübertragung, 1980, Volume 13, Issue 1-2, pp 11-25, A. M. Puzrin, G. T. Houslsby "On the Thermodynamics of Porous Continua, Report No. OUEL 2235/01, University of Oxford, UK, and R. Tribalat "Modelling thermal inertia for load prediction purposes", Centre for environmental policies, Imperial College UK, 2009. Iterative learning control has been applied in the industry in various ways to optimize components and systems, e.g. G. M. Dimitrovski et al. "On Learning Control in industrial furnaces and boilers", Proceedings of the 15th IEEE International Symposium on Intelligent Control (ISIC 2000), and many others.

Further prior art regarding the operation and control of different systems is disclosed within the following documents: U.S. Pat. No. 8,126,574 B2 is showing a system and a method for dynamic multi-objective optimization of machine selection, integration and utilization. US 2012/0101648 A1 is showing energy-optimal control decisions for systems. WO 2014/089694 A1 shows a self-learning control system and method for optimizing a consumable input variable and WO 2013/039553 A1 shows a load forecasting from individual customer to system level.

SUMMARY

In an embodiment, the present invention provides a method for operating a thermal system, wherein a component of a facility or building has to be heated and/or cooled by the thermal system. The method includes selecting a control mode of the thermal system for bringing and/or maintaining the component to or at a definable temperature value or to or within a definable temperature value range. The control mode is dynamically selected from multiple different control modes under consideration of at least one boundary condition of the component and/or at least one environmental context parameter and under consideration of data regarding learnt/adapted thermal behaviour of the component.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention relates to a method for operating a thermal system, wherein a component of a facility or building is to be heated and/or cooled by the thermal system and wherein a control mode of the thermal system is selected for bringing and/or maintaining the component to or at a definable temperature value or to or within a definable temperature value range. Further, the present invention relates to a corresponding thermal system, wherein a component of a facility or building is to be heated and/or cooled by the thermal system and wherein a control mode of the thermal system is selected for bringing and/or maintaining the component to or at a definable temperature value or to or within a definable temperature value range.

Embodiments of the present invention contemplate a method for operating a thermal system and an according thermal system for allowing a reliable heating and/or cooling of a component of a facility or building with high efficiency.

A method according to an embodiment of the invention includes a control mode that is dynamically selected from multiple different control modes under consideration of at least one boundary condition of the component and/or at least one environmental context parameter and under consideration of data regarding learnt/adapted thermal behaviour of the component.

A thermal system according to an embodiment of the invention includes means for dynamically selecting the control mode from multiple different control modes under consideration of at least one boundary condition of the component and/or at least one environmental context parameter and under consideration of data regarding learnt/adapted thermal behaviour of the component. The means for dynamically selecting the control mode can include a processor configured with processor executable instructions for performing a method to dynamically select a control mode from multiple different control modes.

It is possible to allow a very reliable and effective heating and/or cooling of a component by a dynamic selection of a suitable control mode from multiple different control modes, wherein the selection is performed under consideration of at least one boundary condition of the component and/or under consideration of at least one environmental context parameter and in any case under consideration of data regarding learnt/adapted thermal behaviour of the component. Considering such data regarding learnt/adapted thermal behaviour of the component simplifies the selection of an appropriate control mode for reaching the goal of the control in bringing and/or maintaining the component to or at a definable temperature value or to or within a definable temperature value range. Such a dynamic selection of the control mode comprises an actualization of the control mode after definable time periods and/or after a change of a boundary condition or environmental context parameter. Such a boundary condition of the component could be the size of the component and/or the thermal conductivity and/or the material of the component. An environmental context parameter could be a forecasted behaviour of further components of the facility or building, for example.

Within a preferred embodiment the control mode can be dynamically selected in real-time. Such a kind of dynamically selecting the control mode provides a very quick reaction to varying boundary conditions and/or environmental context parameters for providing a very sensitive and efficient heating and/or cooling of the component. Real-time selection can be provided by permanently considering the boundary conditions and/or environmental context parameters for effective selection of an appropriate or a most appropriate control mode.

A very effective real-time selection can be provided in a situation where a real-time monitoring of the at least one environmental or external context parameter and/or of at least one system parameter and/or component parameter and/or subsystem parameter and/or field-context specific parameter is performed during operation of the thermal system. Permanently monitoring such parameters can provide the basis for an appropriate control mode selection.

Within a preferred embodiment the data regarding the learnt/adapted thermal behaviour of the component are based on historic data and operational data monitored during operation of the thermal system. The inventive method can be a self-learning method by monitoring and storing operational data during operation of the thermal system and using said data together with corresponding thermal system adjustments for memorizing the corresponding thermal behaviour of the component. Thus, a data base can be generated by monitoring and storing operational data during operation of the thermal system for learning the thermal system's operational characteristics, wherein said characteristics can be used for dynamically selecting the most appropriate control mode. Said data base can also be used to predict future values of the variables and parameters related to the component and the corresponding thermal system.

In a further beneficial embodiment, environmental or external context parameters are monitored and stored in addition to the thermal systems' operation so that said data base can be enhanced to learn the thermal system's operational characteristics in relation to environmental or external context parameters. Then, integrating forecast information about said environmental or external context parameters can be used for dynamically selecting the most appropriate control mode. Said forecasts can stem from external sources or systems defined in the state of the art.

In a further beneficial embodiment, field-context specific parameters are monitored and stored in addition to the thermal systems' operation, so that said data base can be enhanced to learn the thermal system's operational characteristics in relation to field-context specific parameters. Then, integrating forecast information about said field-context specific parameters can be used for dynamically selecting the most appropriate control mode. Said forecasts can stem from external sources or systems defined in the state of the art.

Preferably, the data regarding the learnt/adapted thermal behaviour of the component are dynamically actualized during operation of the thermal system. Thus, a permanent actualization of said data can be provided during operation of the thermal system.

For providing a very effective operation of the thermal system the control mode can be dynamically selected under consideration of the impact of the control mode on other components of the facility or building. In this regard thermal behaviour of other components of the facility or building can be considered within the dynamic selection process.

Within a further preferred embodiment the control mode can be dynamically selected under consideration of a forecast of an external or environmental context parameter and/or field-context specific parameter and/or under consideration of a forecast of the component's related parameters and/or the parameters of the corresponding thermal system parameters. Thus, expected or forecasted external or environmental context parameters and/or expected or forecasted field-context specific parameter can be considered within the selection process for providing a very effective operation.

Additionally or alternatively dynamically selecting the control mode can be based on a holistic assessment of at least some or of all boundary conditions and/or context parameters.

Within a further preferred embodiment the control mode can be dynamically selected under consideration of a scheduling order, priority list or a rotating scheme between control modes of the component or different components and/or of the systems affecting the component or different components. Such a scheduling order can consider situations where the operation of heating and/or cooling of components is not allowed due to use restrictions of the facility or building, for example.

The process of dynamically selecting the control mode can be activated by human request, by a definable operational status of the component or thermal system or by a time schedule. Depending on an individual situation the most appropriate activation type can be selected.

Concretely, the control mode can define the starting time and the duration of operation of the system and/or of subsystems. Such a definition provides a base definition for operating a thermal system.

Within a further preferred embodiment an environmental context parameter can comprise environmental temperature and/or solar radiation and/or operational restrictions of other components.

Within a further preferred embodiment the control mode can perform a variation of the temperature value or temperature value range within a configurable or definable scope or range. By such a variation various operational data can be monitored during operation for providing a growing data base of historic data. Further, on the basis of such a variation resulting control modes or strategies can be compared with regard to varying costs, for example.

Within a preferred embodiment of the thermal system the means for dynamically selecting the control mode can comprise a control layer, an operational layer, a metering/sensing layer and a data layer, wherein the control layer can comprise means for communication with the operational layer, metering/sensing layer and data layer. Such a thermal system provides a reliable heating/or cooling of a component with high efficiency. Monitored and stored data can be provided in a simple way by such a design of a thermal system. As a result, a reliable and appropriate dynamic selection of a control mode from multiple different control modes is possible. The means for dynamically selecting the control mode can include a processor configured with processor executable instructions for performing a method to dynamically select a control mode from multiple different control modes.

Embodiments of the present invention can address the problem of exploiting dynamic thermal behavior under stochastic operational context for better energy management and operational efficiency of facility or building systems. Proposed methods and systems provide means of selecting control schemes dynamically within specific context boundaries through application of real-time learnt/adapted thermal behavior modelling of building/facility subsystems. Methods aim on a better energy control and operation of the thermal system embedded cooperatively into the facility operation.

The provided dynamic selection can be applied dynamically on a holistic assessment of all context parameters—operational, business or environmental—and on the operational impact those modes will cause.

Historical data can be used within the methods and/or systems for overcoming empirical assumptions and "learn" the operation-context-inertia correlation during operation or run-time. The correct or appropriate strategy can be found in using a multitude of operational control options to maximize the efficiency to use the thermal inertia of active/passive storage components, and embed this strategy into the cooperative control of the facility/building.

Bearing in mind that it is known from prior art to adapt control parameters in defined control schemes and eventually apply intensive physical building modelling, the present invention provides methods and systems for selecting the context-appropriate operational control mode from multiple options.

Within preferred embodiments this selection is performed dynamically on a holistic assessment of all context parameters with respect to starting time, duration and specific parameter choice of the selected operation. This selection method is applied to find the right operation strategy to maximize the energy efficiency by using the thermal inertia of active/passive storage components.

Embodiments of the invention provide means of selecting control schemes dynamically within specific context boundaries and applies learning technologies to dynamically adapt the selection scheme to exploit the thermodynamic characteristics of building or facility subsystems in a cooperative energy and operation management.

According to an embodiment of the present invention a method is provided for dynamically learning of the thermal inertia behavior of a system in order to select and apply an optimized control strategy/mode in real-time based on integrating forecast of external context parameters, and integration of prediction of field-context specific parameters. Further, it is provided a control of field-context specific parameters through real-time actuation of different actuators according to control strategy selection with adaptive schedule of those strategies. Control Strategy selection schemes can cover approaches like scheduling orders, priority lists, rotating schemes between strategies of same or different systems.

According to a preferred embodiment of the invention it is provided a method to select and apply an optimized control strategy/mode in real-time comprising the steps of: 1) Real-time monitoring system for holistic assessment of thermal system, e.g. building, plus external parameters. 2) Definition of thermal target parameters, e.g. grass root temperature range, comfort zones. 3) Continuous learning of thermal and energetic characteristics of the system during ongoing operation and with historic data. 4) Calculation of real-time optimization of control strategies under consideration of target operational context integrating prediction via learned thermal inertia characteristics and context-relevant forecast data and planning. 5) Real-time enforcement of adapted control strategies to thermal system's actuating system.

According to an embodiment, a method is provided to deploy energy savings measures in dynamically changing context environment with stochastic context variability—like external temperature, solar radiation—and difficult modelling context, here: buildings and their subsystems are very specialized systems and individually configured—which are difficult to describe with standards models.

Embodiments of the invention can be especially suitable for meeting thermal constraints during energetic scarcity situations or for energy savings measures with constraints on hard-ware implications, e.g. cost factors.

A method according to the invention can increase demand response capacities and can actively help to manage energy against scheduled black-out/demand response situations by learning and exploiting systemic thermal inertia.

Figure 2:
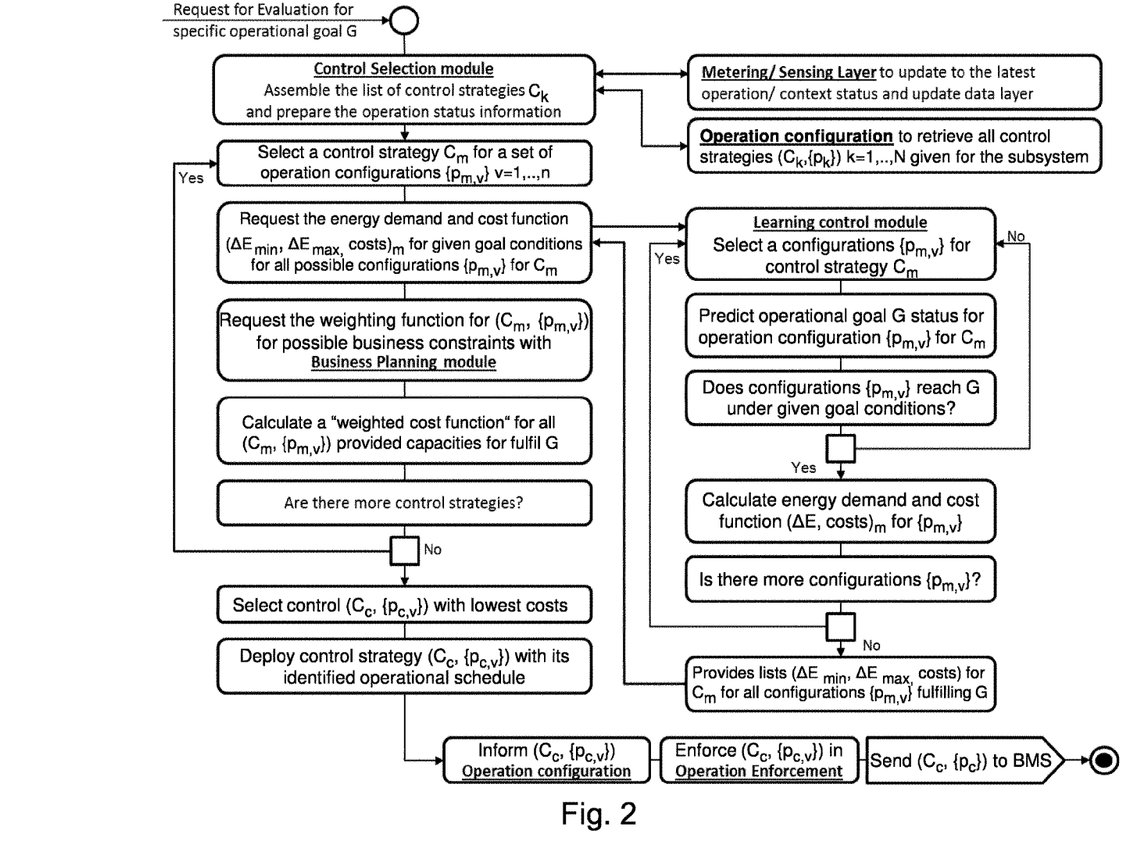
FIG. 2 shows an embodiment of a method according to the present invention for selecting a control mode from multiple possible control modes to reach a target operation status G, also denoted "goal.

It is provided a method to flexibly accept violations of a goal G, see FIG. 2, through policies if the benefits of the associated control strategy costs outweigh the violations.

Embodiments of this invention provide a system and a method for dynamic control selection using thermal-inertia-model identification via learning methods for energy efficiency in buildings. Important aspects are:

A targeted system addresses subsystems of a facility/building which are strongly impacted by their thermal inertia to define its operational status in the context of the entire building system. The impact of the operational control options on thermo-dynamical behavior is dependent on the thermal and environmental context as well as on operational restrictions of other independent but connected system components.

A control selection method identifies its choice between multiple alternating control schemes and multiple input parameters applicable to the same subsystem in order to achieve the same goal.

Iterative learning control for thermal inertia model identification in integration with dynamically set runtime planning horizons, adjustable schedule and context forecast is aimed for enforcing a thermal/temperature uniformity control specifically to the targeted system(s).

A special embodiment is given to active thermal storage systems operated to stabilize business conditions, e.g. grass pitch heating, ice skating fields, outdoor swimming pools, with field specific parameter focus, e.g. grass pitch heating—grass root temperature, ice skating fields—ice field temperature, outdoor swimming pools—target pool water temperature.

A method for selecting optimized control strategy/mode based on dynamically learned behavior of the thermal inertia characteristic of the system can include integrating forecast of external context parameters, integration of prediction of domain-specific parameters, control of field-context specific parameters through actuation of different actuators according to control strategy selection with adaptive scheduling of those strategies.

Definition of Cost Function: In mathematical optimization, statistics, decision theory and machine learning, a loss function or cost function is a function that maps an event or values of one or more variables onto a real number intuitively representing some "cost" associated with the event. An optimization problem seeks to minimize a loss function. An objective function is either a loss function or its negative—sometimes called a reward function or a utility function—, in which case it is to be maximized. In statistics, typically a loss function is used for parameter estimation, and the event in question is some function of the difference between estimated and true values for an instance of data. Source: Wikipedia http://en.wikipedia.org/.

Figure 1:
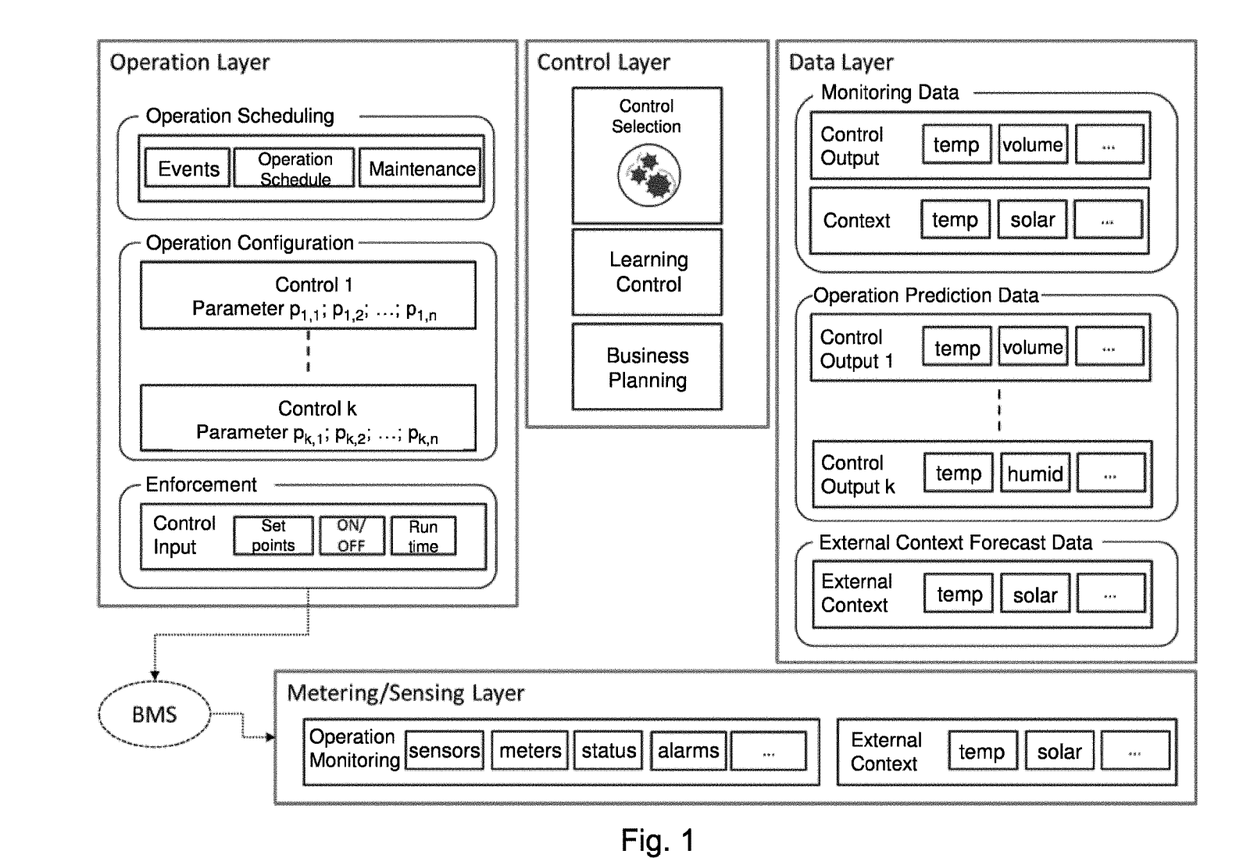
FIG. 1 illustrates an embodiment of a thermal system according to the invention with its system architecture.

FIG. 1 illustrates an embodiment of a thermal system according to the invention, wherein the system comprises different functional modules or core modules. The system is designed as follows: System comprising different layers and configured to enable communication to/from the core modules of the control layer:

Control Selection Module, which defines the appropriate priorities of control strategies under given operational context and selects the control strategy ($C_k$, $\{p_m\}$) with lowest cost function related to goal G, communicates with metering and sensing layer to collect latest system status, communicates with learning control module to retrieve cost estimation for control strategies applicable for considered subsystem goal G for certain point in time and in given planning horizon, communicates with business planning module to integrate the weighting with business parameters like operation schedule, supply planning, economic parameters—pricing, tariffs—etc., and communicates with operation configuration to prepare for deployment of selected control strategy ($C_k$, $\{p_m\}$). In a variation, the Control Selection Module can be configured with policies or cost functions to lower G—if then returned control strategies imply improvements of the corresponding control strategy cost.

A Learning Control Module, which "learns"/calculates the thermal inertia identification from historical data on operation results and context, e.g. via state-of the art machine learning methods, regression models, statistics, as function of {time, context, control scheme} of subsystem, and gradually improves the accuracy of the model, predicts the operational status based on the evolved thermal inertia identification model of given subsystem under specific operational/contextual conditions exploring multiple control strategies Ck and their configuration options {pm}, calculates the costs ($\Delta E$, costs)k,m for a multitude of control strategies Ck and their configuration options {pm} under assumption to reach a certain operational goal G—received from Control Selection—in a given context/operational parameter, e.g. time, volume, communicates with data layer for retrieval of the respective monitoring and forecast data, and storage of updated prediction data, communicates with business planning module to integrate business parameters like operation resources, supply planning, economic parameters—pricing, tariffs—etc., and communicates with control selection module to inform calculated cost functions and related decision variables, e.g. weighting parameters, etc.

Business Planning Module, which Communicates with operational scheduling unit on planned occasions impacting the resources for subsystem usage, e.g. building usage events, maintenance, operational resources, and Communicates with control selection module to provide information on operational constraints of scheduling, economic information like supply planning, pricing constraints etc., may be combined with priority weights.

To the components and service units: Operational Layer: Operation scheduling—holding information on scheduling for events, maintenance, resource management etc., Operation configuration—assembles all parameters for the control strategies, Operation enforcement—communicating with the local facilities' BMS to deploy the selected control strategy with given parameters and operational settings like start time, run-time.

Metering/Sensing Layer: collects monitoring data from local facilities' BMS to data layer.

Data Layer: Stores all operational monitoring data, Stores prediction data from learning control unit on operational prediction, Stores context forecast values calculated by learning control module or retrieved from external functions for the external context forecast data.

The aim of the control selection method is to use the "learned" thermal inertia model based on historic and ongoing operational information in order to select the most appropriate control strategy to reach the lowest cost function for increasing operational and energy efficiency. The method will continuously evaluate the subsystem control strategies triggered by human request, operational status or other means—like time schedule, supply cost modification—and adjust the operation accordingly. Due to long-term application in consistent manner, the method will increase its accuracy over long-time running and reach its stability depending on metering and sensing resolution. With higher granularity deployed, the system automatically can adapt to the new settings/sensing. In a variation, the control selection method is allowed to alter the operational goal G—e.g. a definable temperature value or definable temperature value range—and compare the resulting control strategies' costs—this way, e.g. a 1° C. violation of a target temperature may be seen as less critical if e.g. 25% energy savings can be achieved over a certain period.

FIG. 2 presents a preferred example method to select a control strategy or control mode to enable the goal G.

Within a preferred embodiment and system grass heating optimization of a soccer field can be provided. This embodiment addresses the heating control of a grass pitch of a soccer arena, which can be controlled by two distinct control strategies configurable by different parameters in heating time and/or supply temperature.

Figure 3:
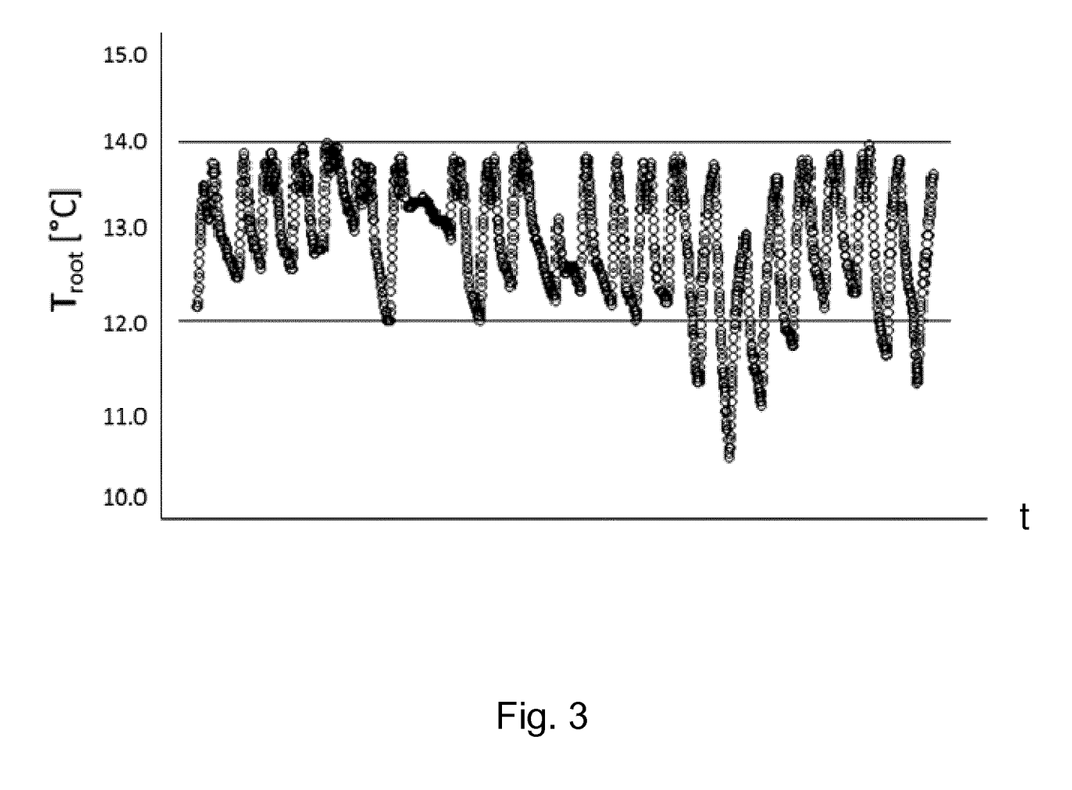
" and FIG. 3 shows a diagram presenting a control of a temperature of a component within a definable temperature value range.

The diagram in FIG. 3 presents the result of a simplified method to dynamically select new control set points—here different supply temperature set point configurations $T_{G,set}$—to balance the grass root temperature within a given band marked with horizontal lines.

The diagram in FIG. 3 is showing the temperature of a grass root in dependence from the time t. The temperature has to be maintained within the defined temperature value range between 12.0 and 14.0° C. The temperature value can be influenced by the supply of a heating liquid with varying temperature. If the temperature of the grass root decreases, heating liquid with higher temperature is supplied, so that the root temperature is increasing. If the root temperature is going to the upper range limit, then the temperature of the supply liquid can be reduced, so that the root temperature decreases.

Let's consider this embodiment in detail on an example to switch between heating and cooling strategies to hold a certain temperature in a given range:

Knowing the start time to at which energy needs to be reduced below $Q_{target}$ for the time span $\Delta t$, and a threshold temperature $T_{target}$ which should not be exceeded in case of cooling—undercut in case of heating—, the system calculates the optimal operation based on the current temperature $T(t_{now})$:

We denote the cooling characteristics applied to the component under consideration over time period $\Delta t$ subject to exogenous influences cool($\Delta t$, EI) and the heating characteristics heat($\Delta t$, EI). The inverse of the cooling characteristics is denoted inv(cool($\Delta t$, EI)), the inverse of the heating inv(heat($\Delta t$, EI)).

In the following, we describe in pseudo-code how for each possible characteristic, the appropriate switch-on time $t_{on}$ is selected, In case of heating:

For all cooling characteristics cool known where $Q_{cool} < Q_{target}$:

$$T(t_0 + \Delta t) >= T_{target}$$

$$T(t_0)_{cool} >= \text{inv}(\text{cool}(\Delta t, \text{EI})) + T_{target}$$

For all heating characteristics heat calculate for each $T(t_0)_{cool}$:

$$\max(t_{on,heat}), \text{ subject to: } T(t_{on,heat}) + \text{heat}(\Delta t, \text{EI})) >= T(t_0)_{cool}$$

$$t_{on,heat} >= t_{now}$$

$$t_{on,heat} <= t_0$$

In case of cooling:

For all heating characteristics heat known where $Q_{heat} < Q_{target}$:

$$T(t_0 + \Delta t) <= T_{target}$$

$$T(t_0)_{heat} <= \text{inv}(\text{heat}(\Delta t, \text{EI})) + T_{target}$$

For all cooling characteristics cool calculate for each $T(t_0)_{heat}$:

$$\max(t_{on,cool}), \text{ subject to: } T(t_{on,cool}) + \text{cool}(\Delta t, \text{EI})) >= T(t_0)_{heat}$$

$$t_{on,cool} >= t_{now}$$

$$t_{on,cool} <= t_0$$

In both algorithms, $T(t_{on})$ itself is a function of $T(t_{now})$, the cooling and/or heating characteristics and the time span ($t_{on} - t_{now}$).

In a beneficial embodiment, the overall estimated energy of each combination $Q_{heat} + Q_{cool}$ is calculated.

In another embodiment, $T_{target}$ corresponds to a range of acceptable temperatures as illustrated in FIG. 3.

In a variation of above algorithms, additional temperature constraints may be introduced in the maximization calculation to obey e.g. a maximum pre-heating temperature or a minimum pre-cooling temperature.

Based on configurable policies, one combination of heat and cool and $t_{on}$ is selected, e.g. one that minimizes overall energy consumption in the period ($t_0 + \Delta t - t_{now}$).

In a beneficial embodiment, the learned heating characteristics are updated according to observed information. Methods for this are e.g. online learning approaches that adapt the way to forecast temperatures under exogenous conditions and set points dynamically.

In particular for systems with high thermal inertia, such as grass heating systems, or buildings with large thermal mass, a control can be performed to withstand extensive periods of system de-activation and present massive capacity for load-balancing in case of Demand Response or other energy scarcity situations. This could also be applied to store energy from renewable energy sources.

Outage/Reduction times may be communicated beforehand—e.g. Demand Response—or stem from a prediction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a thermal system, wherein a component of a facility or building has to be heated and/or cooled by the thermal system, the method comprising:
    selecting a control mode of the thermal system for bringing and/or maintaining the component to or at a definable temperature value or to or within a definable temperature value range,
    wherein the control mode is dynamically selected from multiple different control modes under consideration of at least one boundary condition of the component and/or at least one environmental context parameter, under consideration of data regarding learnt/adapted thermal behaviour of the component, and under consideration of an impact of the control mode on other components of the facility or building, and wherein the component is used as a thermal storage subsystem that is actively managed by the selected control mode, and
    wherein the data regarding the learnt/adapted thermal behaviour of the component is based on historic data and operational data monitored during operation of the thermal system.

2. The method according to claim 1, wherein the control mode is dynamically selected in real-time.

3. The method according to claim 1, wherein a real-time monitoring of the at least one environmental context parameter and/or of at least one system parameter and/or component parameter and/or subsystem parameter is performed during operation of the thermal system.

4. The method according to claim 1, wherein the data regarding the learnt/adapted thermal behaviour of the component is dynamically actualized during operation of the thermal system.

5. The method according to claim 1, wherein the control mode is dynamically selected under consideration of a forecast of an external or environmental context parameter and/or under consideration of a forecast of the component's related parameters and/or the parameters of the corresponding thermal system parameters.

6. The method according to claim 1, wherein dynamic selection of the control mode is based on a holistic assessment of at least some boundary conditions and/or context parameters.

7. The method according to claim 1, wherein the control mode is dynamically selected under consideration of a scheduling order, priority list or a rotating scheme between control modes of the component or different components.

8. The method according to claim 1, wherein dynamic selection of the control mode is activated by human request, by a definable operational status of the component or thermal system or by a time schedule.

9. The method according to claim 1, wherein the control mode defines a starting time and a duration of operation of the system and/or of subsystems.

10. The method according to claim 1, wherein an environmental context parameter comprises environmental temperature and/or solar radiation and/or operational restrictions of other components.

11. The method according to claim 1, wherein the control mode performs a variation of the temperature value or temperature value range within a configurable or definable scope or range.

12. The method according to claim 1, wherein the thermal system includes at least one heating, ventilation, air conditioning (HVAC) subsystem.

13. A thermal system, wherein a component of a facility or building has to be heated and/or cooled by the thermal system and wherein a control mode of the thermal system is selected for bringing and/or maintaining the component to or at a definable temperature value or to or within a definable temperature value range, the thermal system comprising
    a processor configured with processor executable instructions for dynamically selecting the control mode from multiple different control modes under consideration of at least one boundary condition of the component and/or at least one environmental context parameter, under consideration of data regarding learnt/adapted thermal behaviour of the component, and under consideration of an impact of the control mode on other components of the facility or building, and wherein the component is used as a thermal storage subsystem that is actively managed by the selected control mode, and
    wherein the data regarding the learnt/adapted thermal behaviour of the component is based on historic data and operational data monitored during operation of the thermal system.

14. The thermal system according to claim 13, wherein the processor executable instructions implement a control layer, an operational layer, a metering/sensing layer and a data layer, wherein the control layer is configured for communication with the operational layer, metering/sensing layer and data layer.

15. The thermal system according to claim 13, wherein the thermal system includes at least one heating, ventilation, air conditioning (HVAC) subsystem.

* * * * *